Aug. 22, 1933.  F. H. SNYDER  1,923,332
TRACTOR
Filed Feb. 10, 1931  2 Sheets-Sheet 1
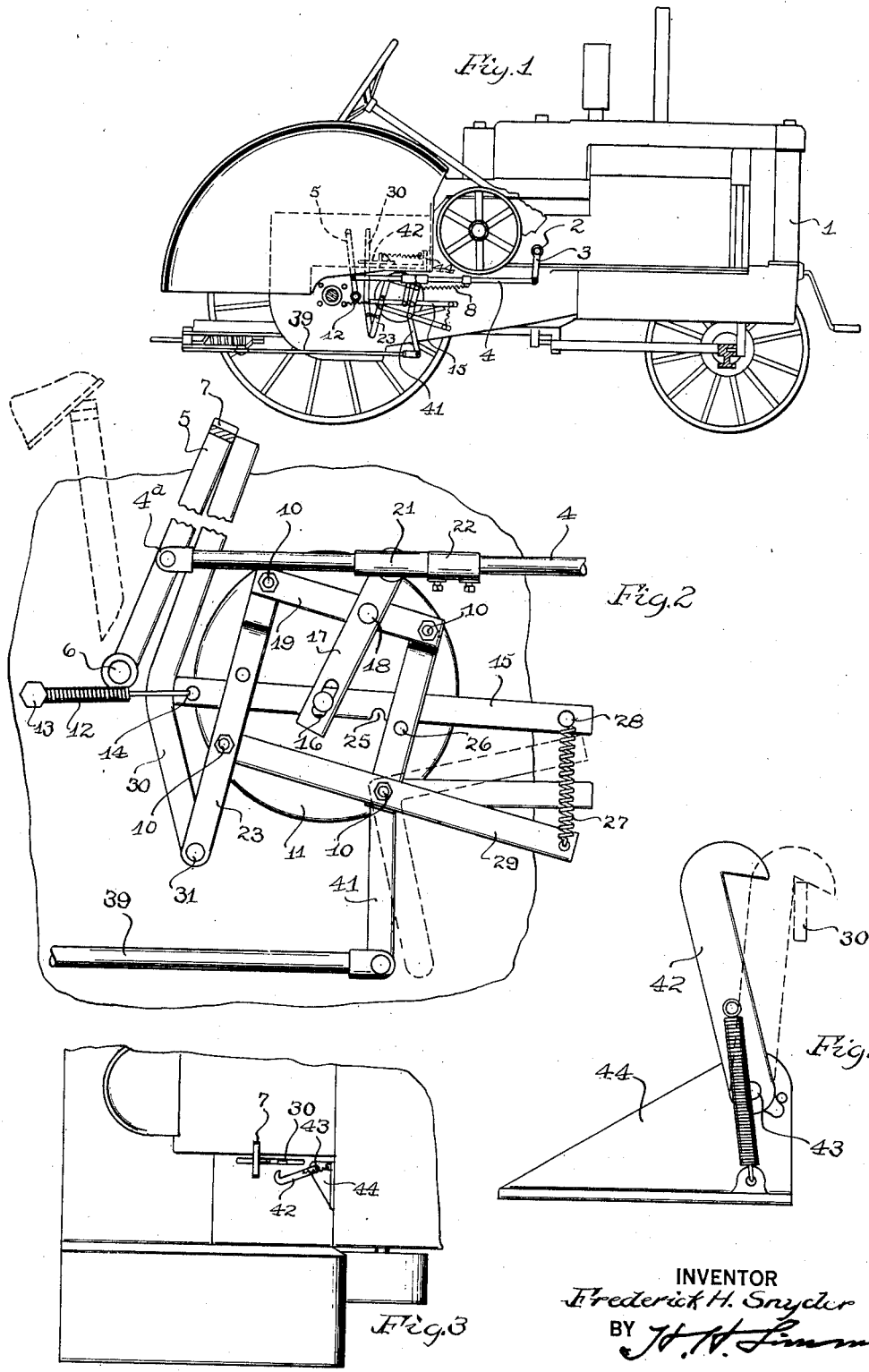
INVENTOR
Frederick H. Snyder
BY H. H. Simms
his ATTORNEY Aug. 22, 1933.   F. H. SNYDER   1,923,332
TRACTOR
Filed Feb. 10, 1931   2 Sheets-Sheet 2
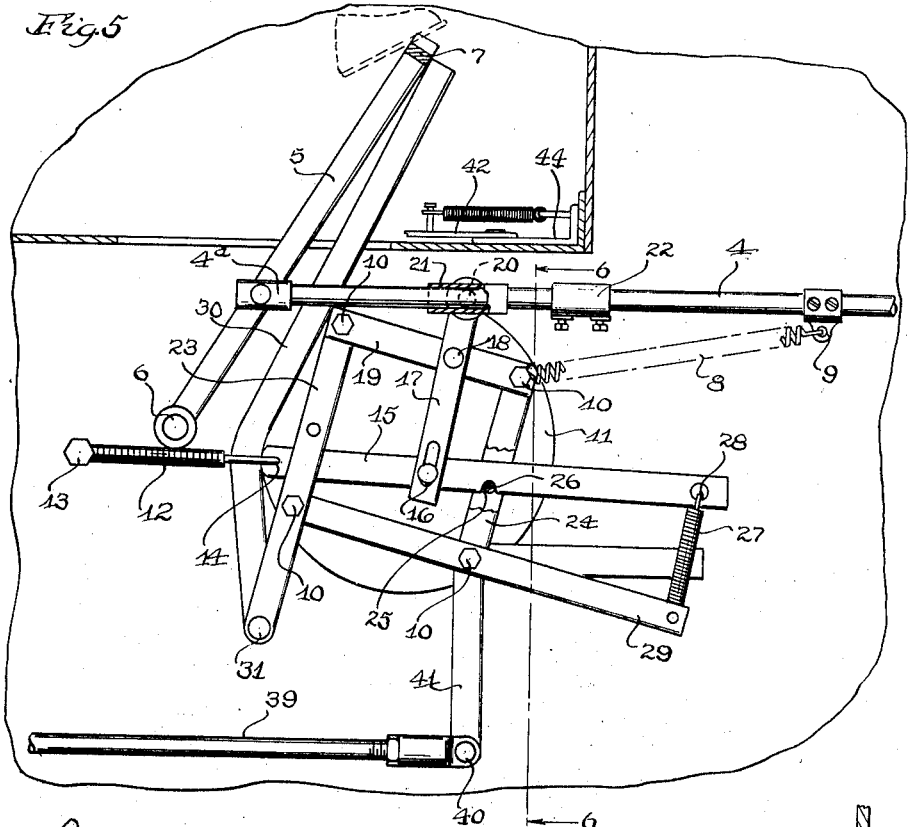
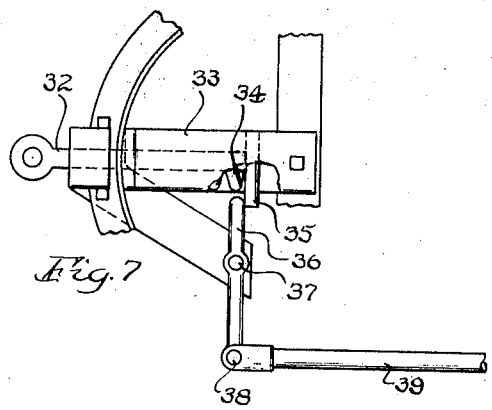
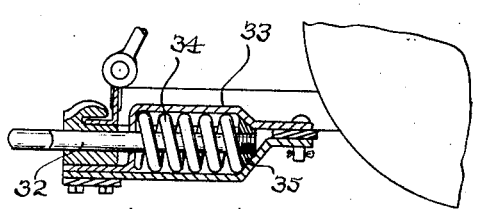
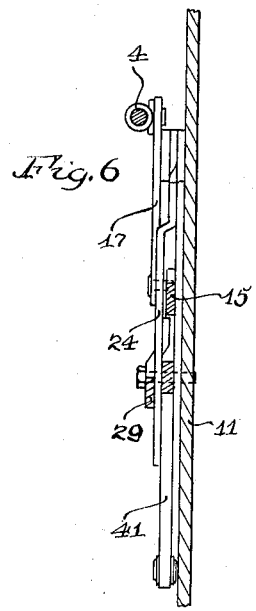
INVENTOR
Frederick H. Snyder
BY
his ATTORNEY Patented Aug. 22, 1933

1,923,332

UNITED STATES PATENT OFFICE 1,923,332

TRACTOR

Frederick H. Snyder, Churchville, N. Y.

Application February 10, 1931. Serial No. 514,780

7 Claims. (Cl. 180—14.5)

The present invention relates to tractors and more particularly to the type equipped with an auxiliary means for effecting the opening of the clutch between the motor and the traction wheels when the implement drawn by the tractor strikes an obstruction which will cause breakage or damage to some part of the tractor or the implement drawn by the tractor.

An object of this invention is to provide in addition to the usual clutch operating means an auxiliary clutch operating mechanism which is operated by a spring controlled by the draft means of the vehicle. Another object of the invention is to provide for storing energy in the spring of the auxiliary clutch operating means through the main clutch operating means. Still another object of the invention is to provide an auxiliary clutch operating mechanism designed for use on that type of tractor in which the main clutch operating mechanism embodies a push bar and a foot lever having pivotal connection with the push bar. A still further object of the invention is to provide a draft clutch operating mechanism which will be of compact form, simple in operation and durable in use.

To these and other ends, the invention consists of certain parts and combinations of parts all of which will be hereinafter described: the novel features being pointed out in the appended claims.

In the drawings:

Fig. 1 is a side view of a commercial tractor equipped with one embodiment of the present invention;

Fig. 2 is an enlarged view of a portion of the auxiliary clutch operating mechanism, partly in section, showing in dotted lines, the foot lever of the main clutch operating means in neutral position and in full lines the foot lever partially depressed.

Fig. 3 is a fragmentary plan view of the tractor showing the position of the lock-off device for the auxiliary clutch operating means;

Fig. 4 is a detailed view of the lock-off device;

Fig. 5 is a fragmentary view of the tractor showing the auxiliary clutch operating means fully depressed with energy stored in the spring;

Fig. 6 is a section on the line 6—6, Fig. 5;

Fig. 7 is a detail view of the draft means; and

Fig. 8 is a vertical section through the draft means.

In the illustrated embodiment of the invention, 1 indicates a tractor of known commercial construction having a rock shaft 2 through which the clutch (not shown) is operated. This shaft carries an arm 3 to which a push rod or bar 4 is pivoted, said bar being pivotally connected at 4ª to a foot lever 5, which at its lower end, is pivoted at 6 to the tractor, and has a pedal 7 at its upper end. A spring 8 secured at 9 to the rod 4 and to one of four bolts 10 serves to move the clutch rod 4 in a rearward direction to hold the clutch closed. The bolts 10 serve to secure a disk or plate 11 over a hand opening in the side of the tractor frame. All of these parts are present in the commercial tractor. These bolts also serve to fixedly secure in place the following members, to wit, members 19, 23, 24 and 26.

A feature of this invention is the provision of a spring 12 which when allowed to do so will shift the rod 4 in a forward direction to open the clutch. In this instance, the spring 12 has a lost motion connection with the main clutch operating means, the latter of which comprises the rod 4 and the foot operated pedal 5, so that the main clutch operating means may may be operated to open the clutch independently of the spring 12. The spring 12 which is anchored at one end at 13 to the tractor frame and has its other end connected at 14 to one end of a double armed clutch operating lever 15 which has a loose pivotal connection at 16 with the lower end of a two armed lever 17 which is pivoted at 18 to a supporting bar 19 secured by two of the bolts 10. The upper end of the two armed lever 17, which lever 17 is sometimes referred to as an intermediate lever, is pivotally connected at 20 with a sleeve 21 which is fixed to the rod 4 and which is mounted for sliding movement on the rod 4. On the rod 4 is a collar 22 which is fixed to the rod 4 and which acts as an abutment for engagement by the movable sleeve 21 to shift the rod 4 in a forward direction to open the clutch, the rod being movable independently of the sleeve in a forward direction under the action of the foot lever 5 because of the lost motion connection provided by the collar 22 fixed to the rod 4 and the sleeve 21 mounted upon but slidable along the rod 4.

The two armed clutch operating lever 15 is guided between the two bars 23 and 24, secured by the bolts 10, on the one hand and the plate 11 on the other. The lever 15 is notched so as to form an abutment 25 which is adapted to engage with a fixed pin or abutment 26 to hold the spring 12 with energy stored therein, as shown in Fig. 5. A spring 27, connected at 28 to one end of the lever 15 and at the other end to an arm or bar 29 which is secured by two of the bolts 10, serves to hold the clutch operating lever 15 in sliding engagement with the abutment 26 so that the abutment 25 may ride to such abutment 26 when the spring is placed under tension.

With the end in view of storing energy in the spring 12 and thereby to reset the auxiliary clutch operating means or lever 15 by means of the foot lever 5 of the main clutch operating means, a lever 30 sometimes referred to as the auxiliary lever is provided which is pivoted at 31 to the projecting lower end of the fixed bar 23. This auxiliary lever 30 lies in cooperative engagement with the adjacent or rear end of the clutch operating lever 15 and projects upwardly in front of the foot lever 5 of the main clutch operating means so as to be engaged by the latter during the final part of the forward movement of the latter to open the clutch. Thus, when the foot lever 5 is moved forwardly the pivoted auxiliary lever 30 of the clutch operating means is moved forwardly, under the impetus given it during the final part of the forward movement of the foot lever of the main clutch operating means and this movement imparts a forward sliding movement to the clutch operating lever 15, the latter of which slides forwardly on the abutment 26 of the bar 24 until the notch or abutment, or abutment section 25 engages with the fixed abutment or abutment pin 26, whereby the clutch operating lever 15 is then locked in place and in a position in which the spring 12 will be held by such holding means in a set or extended position with energy stored therein as fully shown in Fig. 5. The forward movement of the clutch operating lever 15 imparts through the intermediate lever 17 a rearward movement of the lost motion sleeve member 21 along the bar or rod 4, to-wit, in a direction opposite that in which the sleeve member 21 must move to effect an opening of the clutch by movement of the bar or rod 4.

Release of the spring actuated clutch operating lever 15, to-wit, of the auxiliary clutch operating means that comprise said lever 15, may be effected by a releasing means controlled by a draft means through which an implement such as a plow is pulled by the tractor. The draft means, in this instance, comprises a draft pin 32 having a sliding movement in a pivoted draft head 33 resisted by a spring 34. An abutment 35 on the pin is extended laterally from the pin to engage with one end of a lever 36 which is pivoted between its ends at 37 and has pivoted thereto at 38 a push bar 39, the forward end of which is pivoted at 40 to one arm of a bell crank lever 41 pivoted to one of the pins 10, the other arm of the bell crank lever lying in a position to engage the under side of the forward arm of the lever 15.

The spring 34 is so designed that under normal conditions it will yield but slightly, but when the implement strikes an obstruction such as a stone or stub of a tree, the spring yields so that the abutment 35 shifts the lever 36 to push the bar 39 forwardly and cause the bell crank lever 41 to rock on its pivot until the free end thereof engages the outer end of the lever 15; further upward movement of the free end of the bell crank lever 41 will cause an upward movement of the lever 15 on its pivotal end and thereby disengage the notch 25 from the stationary pin or abutment 26, releasing the spring 12 and permitting the latter to shift the lever 17 to throw the sleeve against the collar 22 and move the rod or bar 4 forwardly to open the clutch. After the clutch has been opened it stays open until the foot lever 5 is pushed still further forward to shift the lever 15, store energy again in the spring 12 and make the holding means effective.

With the end in view of locking the auxiliary clutch operating means against operation, a lock-off device is provided which, in this instance, comprises a detent 42 which is pivoted at 43 to a plate 44 which is so situated that it will engage the lever 30 when the latter is moved to store energy in the spring 12 and hold the spring against action. This does not interfere with the operation of the clutch through the foot lever 5.

What I claim as my invention and desire to secure by Letters Patent is:

1. In a tractor, the combination with a clutch operating means embodying a push bar and a foot lever pivotally connected to the push bar, of a spring having a pivoted lost motion connection with the push bar to move the latter to open the clutch while permitting an independent movement of the clutch operating means to open the clutch, holding means for holding the spring with energy stored therein, means connecting the spring with the clutch operating means to store energy in the spring, and draft means operatively connected to the holding means to release the spring to effect the movement of the clutch operating means to open the clutch.

2. In a tractor, the combination with a clutch operating means including a push bar and a foot lever having pivotal connection with the push bar, of a clutch operating lever having a lost motion connection with the push bar for moving the bar in one direction while permitting the bar to move in the same direction independently thereof under the action of the foot lever, a spring connected with said clutch operating lever to move it in the direction to shift the rod to open the clutch, means connecting said lever with the foot lever to cause the latter to move the clutch operating lever in a direction to store energy in the spring, holding means for holding said clutch operating lever with energy stored in the spring, and draft means having connection with the holding means for releasing said clutch operating lever to the action of the spring.

3. In a tractor, the combination with a clutch operating means embodying a push bar and a foot lever having pivotal connection with the push bar, of an auxiliary clutch operating means including a clutch operating lever having connection with said push bar for moving the bar in one direction while permitting the bar to move in the same direction independently thereof under the action of said foot lever, a spring connected with said clutch operating lever to move it in the direction to shift the rod to open the clutch, means for causing said clutch operating lever to be actuated from the foot lever so as to move the clutch operating lever in a direction to store energy in the spring, holding means for holding said clutch operating lever in a position in which energy is stored in the spring, and draft means having connection with the holding means for releasing said clutch operating lever to the action of the spring.

4. In a tractor, the combination with a clutch operating means embodying a push bar and a foot lever having pivotal connection with the push bar, an auxiliary clutch operating means including a spring and a clutch operating lever having a connection for operating the clutch to open the same, holding means for holding said clutch operating lever with energy stored in the spring, means for effecting the release of said spring from said holding means, draft means operatively connected with said releasing means to operate the latter when an obstruction is met by the implement pulled by the tractor, a fixed bar, an auxiliary lever adjacent said clutch operating lever and having pivotal connection with said fixed bar and projecting upwardly in front of the foot lever, said auxiliary lever being connected for imparting a sliding motion to said clutch operating lever upon the forward movement of said foot lever, whereby to restore energy in said spring and to reset said auxiliary clutch operating means.

5. In a tractor, the combination with a clutch operating means embodying a push bar or rod and a foot lever having pivotal connection with said push bar, of a two armed lever, one arm of which has a lost motion operating connection with the push bar to operate the latter to open the clutch, a clutch operating lever pivotally connected between its ends to the other arm of said two armed lever, a spring connected to one end of the clutch operating lever to move it in a direction to cause a shifting of the push bar to open the clutch, an abutment section on one portion of the clutch operating lever, a fixed abutment with which said clutch operating lever abutment section is adapted to engage to hold the spring under tension, a second spring for holding the clutch operating lever abutment section towards said fixed abutment, an operative connection between the clutch operating lever and the foot lever, whereby the foot lever can move the clutch operating lever to store energy in the first mentioned spring, and draft means operatively connected with the clutch operating lever to shift the abutment thereon out of engagement with the fixed abutment.

6. In a tractor, the combination with a clutch operating means having a push bar, an abutment on the push bar, a lever, a sleeve slidable on the push bar to engage the abutment and having the lever pivotally connected thereto, a spring having a connection with the lever to move the latter in one direction, means for holding said lever so as to store energy in said spring and for holding said lever with the sleeve out of engagement with said abutment and in a position in which the spring is held with the energy stored therein and draft means operatively connected to the holding means for releasing said holding means, whereby said spring due to the energy stored therein can move said lever in a manner to cause the slidable sleeve to engage the abutment on the push bar and thereby move the push bar.

7. In a tractor, the combination with a clutch operating means, of an auxiliary clutch operating means including a spring for shifting said clutch operating means to release the clutch when the spring is otherwise free to do so, means for holding said spring with energy stored therein so that it cannot shift said clutch operating means until released, means for effecting the release of said spring from the resisting action of said holding means, and locking means between the frame of the tractor and the auxiliary clutch operating means for rendering the latter ineffective without interfering with the operation of the clutch operating means.

FREDERICK H. SNYDER.